Dec. 26, 1950
S. BOGER ET AL
2,535,562
TIRE LOOSENING TOOL
Filed Dec. 16, 1948
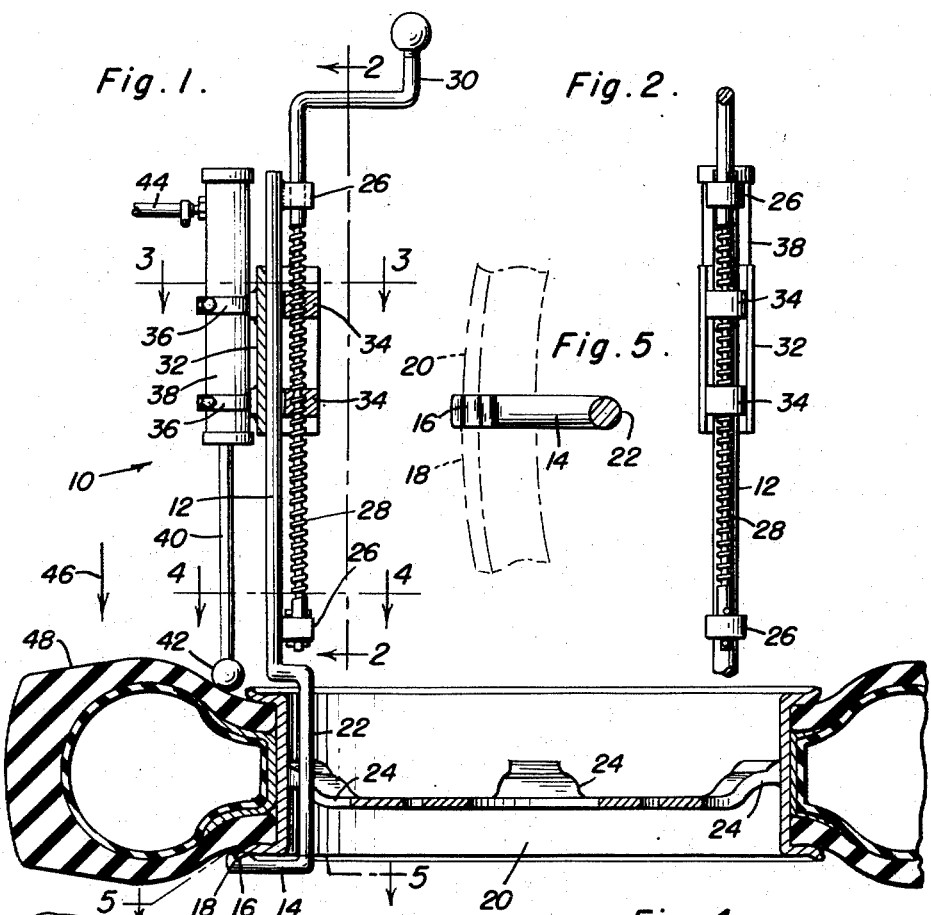
Sam Boger
Dale V. Davis
INVENTORS
BY *Clarence A. O'Brien
and Harvey B. Jackson*
Attorneys Patented Dec. 26, 1950

2,535,562

UNITED STATES PATENT OFFICE 2,535,562

TIRE LOOSENING TOOL

Sam Boger and Dale V. Davis, Dodge City, Kans.

Application December 16, 1948, Serial No. 65,598

2 Claims. (Cl. 157—1.26)

This invention relates to new and useful improvements and structural refinements in tools for loosening tires, and the principal object of the invention is to provide a device of this character wherein the actual tire loosening operation is effected by air pressure, such as for example, from a compressed air hose commonly used for filling tires.

This object is achieved by the provision of the tool herein described which includes in its construction a support engageable with the wheel and provided with an air cylinder having a reciprocable piston rod engageable with the tire, so that upon actuation of the air cylinder the tire bead may be loosened from the wheel rim in a highly expeditious and convenient manner.

An important feature of the invention resides in the provision of means for adjusting the tire loosening tool to accommodate wheels and tires of various sizes and types.

Some of the advantages of the invention lie in its simplicity of construction, convenience of operation, and in its adaptability to economical manufacture.

With the above more important objects and features in view and such other objects and features as may become apparent as this specification proceeds, the invention consists essentially of the arrangement and construction of parts as illustrated in the accompanying drawings, in which:

Figure 1 is a cross sectional view of a wheel and tire, showing the invention applied thereto, the invention being partially broken away so as to reveal its construction;

Figure 2 is a fragmentary cross sectional view, taken substantially in the plane of the line 2—2 in Figure 1;

Figure 3 is a fragmentary cross sectional view, taken substantially in the plane of the line 3—3 in Figure 1;

Figure 4 is a fragmentary cross sectional view, taken substantially in the plane of the line 4—4 in Figure 1, and Figure 5 is a fragmentary cross sectional view, taken substantially in the plane of the line 5—5 in Figure 1.

Like characters of reference are employed to designate like parts in the specification and throughout the several views.

Referring now to the accompanying drawings in detail, the invention consists of a tire loosening tool designated generally by the reference character 10, the same embodying in its construction a support bar 12, one end portion of which is angulated as at 14 and is provided with a pair of spaced detents defining therebetween a groove or seat 16 which is engageable with the usual rim 18 at one side of a vehicle wheel 20, as will be clearly apparent.

A portion of the bar 12 immediately adjacent the angulated portion 14 is laterally offset as indicated at 22 in Figure 1, this being necessary to facilitate engagement of the seat 16 with the rim 18 while the portion 22 of the support bar extends through the wheel, substantially as shown. It should, of course, be understood that the center portion of the wheel 20 is provided with one or more openings 24, through which the support bar portion 22 may extend, and it is to be noted that the bar 12 is equipped with a pair of spaced bearing blocks 26 in which a screw threaded shaft 28 is rotatably journaled. Suitable means are provided for preventing the shaft 28 from shifting longitudinally, and one end portion of the shaft terminates in a crank handle 30, substantially as shown.

A carrier 32, having a substantially U-shaped cross sectional configuration, is provided with a pair of spaced brackets 34 which, in turn, are formed with aligned bores so that the carrier 32 may be slidably positioned on the bar 12. Moreover, the brackets 34 are provided with aligned, screw threaded bores which operatively engage the screw threaded shaft 28, so that by simply rotating the handle 30 in one direction or the other, the carrier 32 may be slid upwardly and downwardly on the bar 12, as will be clearly apparent.

A pair of suitable clamps 36 are secured in spaced relation to the carrier 32 and removably receive therein an air cylinder 38, the latter including a reciprocable piston rod 40 provided at its outer end with a spherical tire pressing member 42.

The air cylinder 38 may be connected by a flexible hose 44 to a source of compressed air, such as for example, a compressed air hose commonly employed for filling pneumatic tires.

When the invention is placed in use, the support bar 12 is applied to the wheel 20 so that the seat 16 engages the rim 18 at one side of the wheel, whereupon, by actuation of the air cylinder 38, the piston rod 40 may be caused to travel in the direction of the arrow 46 in Figure 1, thus bringing the member 42 in engagement with the bead portion of the tire 48 at the relatively opposite side of the wheel 20, and loosening the tire from the wheel rim. Needless to say, the loosening operation may be repeated as many times as required, at circumferentially spaced points on the wheel.

It is to be noted that the pressure exerting member 42 is disposed substantially in alignment with the seat 16, that is to say, the seat 16 is disposed substantially on a projected axis of the piston rod 40, so that the loosening operation is effected more-or-less along a direct line of force, eliminating undue twisting or binding of the tool.

By simply rotating the handle 30, the device may be adjusted to accommodate wheels and tires of various sizes and types, and finally, it may be added that while in the accompanying drawings the offset portion 22 of the bar 12 is shown as extending through the wheel 20, the portion 22 may be offset to a "deeper" extent, so to speak, so that it may straddle the tire 48 and still facilitate engagement of the wheel rim with the seat 16. An arrangement of this character will be found of convenience when the invention is employed in association with vehicle wheels having a "solid" center portion, that is, devoid of the usual openings 24.

It is believed that the advantages and use of the invention will be clearly apparent from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

1. In a tire loosening tool, the combination of a support bar having an angulated end portion adapted to engage a wheel rim, a carrier longitudinally adjustable on said support bar, means for adjusting said carrier, an air cylinder including a reciprocable piston rod secured to said carrier, a tire pressing member provided on said piston rod, said member being movable toward the angulated end portion of said support bar upon actuation of said cylinder, said means including a screw-threaded shaft rotatably mounted on said support bar in spaced parallel relation thereto, and a handle provided on said shaft, said carrier being provided with a screw-threaded bore operatively engaging said shaft.

2. A tire loosening device comprising a support bar having an angulated end portion provided with a wheel rim seat, a screw-threaded shaft rotatably mounted on said bar in spaced parallel relation thereto, a carrier including a pair of spaced brackets slidable on said bar and formed with aligned and screw-threaded bores to operatively engage said shaft, a crank handle on said shaft, a set of clamps on said carrier, an air cylinder including a reciprocable piston rod secured in said clamps, and a tire pressing member provided on said piston rod and movable toward and away from said seat.

SAM BOGER.
DALE V. DAVIS.

REFERENCES CITED

The following references are of record in the file of this patent:

UNITED STATES PATENTS

| Number | Name | Date |
|---|---|---|
| 2,179,896 | Neville | Nov. 14, 1939 |
| 2,281,476 | Casey | Apr. 28, 1942 |